UNITED STATES PATENT OFFICE.

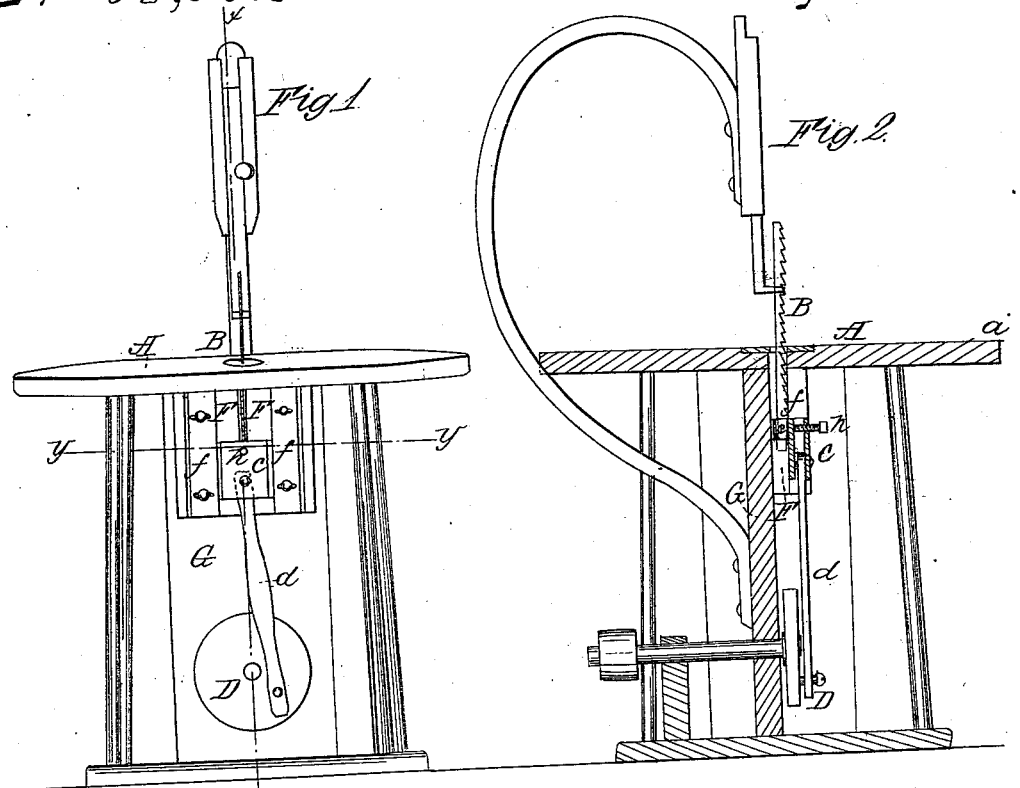
W. Dobson,
Scroll Saw.
No. 82,501. Patented Sep. 29, 1868.
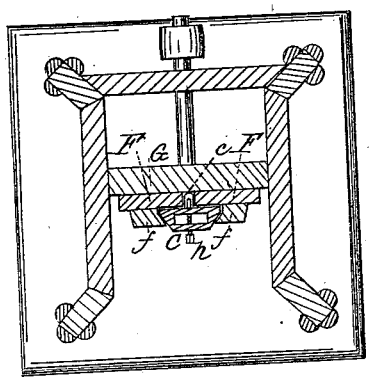
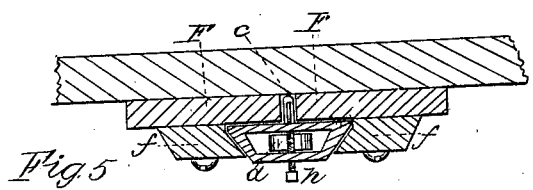
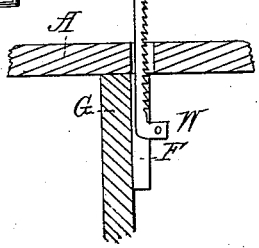
Witnesses
Inventor
William Dobson
per F. A. Morley
Atty

WILLIAM DOBSON, OF MEDINA, NEW YORK, ASSIGNOR TO HIMSELF AND JOHN W. MOUNT, OF THE SAME PLACE.

IMPROVEMENT IN SCROLL-SAWS.

Specification forming part of Letters Patent No. 82,501, dated September 29, 1868.

*To all whom it may concern:*

Be it known that I, WILLIAM DOBSON, of Medina, in the county of Orleans and State of New York, have invented a new and useful Improvement in Scroll-Saws; and I do hereby declare that the following is a clear, full, and exact description thereof, which will enable those skilled in the art to make and use the same, reference being had to the accompanying drawings, forming part of this specification, in which—

Figure 1 is a front view of my invention. Fig. 2 is a vertical section taken in the line $x\ x$ in Fig. 1. Fig. 3 is a horizontal section taken in the line $y\ y$ in Fig. 1. Fig. 4 is an enlarged detail view, and Fig. 5 shows a modification in the connection between the saw and its cross-head.

Similar letters of reference indicate corresponding parts in all the figures.

For making smooth work, it is desirable to have scroll-saws run at as high a velocity as is pos ible; and to attain this end I dispense with a saw-gate or sash, and with all other devices for training the saw, and employ a muley-saw, for its lightness and simplicity; and by providing steadying-guides for the saw below the table, and making all the driving devices as light as possible, I am enabled to run the saw at a velocity of two thousand revolutions per minute.

My invention consists in running that part of the saw which is below the table between two guide-pieces, to prevent the saw from doubling up when run at a high velocity; and also, in connection with these guides, a very thin or narrow loop, which projects from the cross-head, and makes connection with the saw between the said guides; and my invention further consists in the use of an inclined table, in connection with a raking-saw, so that the saw will make square work in cutting curved lines or circles, as hereinafter more fully explained.

In the accompanying drawing, A is the table, B the saw, C the cross-head, and D $d$ the driving-crank and pitman. Below the table A, and upon each side of the saw, I place guide-pieces F F, to steady the saw and prevent its being doubled up below the table when run at a high velocity. The saw is attached to the cross-head C by means of a loop, $c$, Figs. 2, 3, and 4, projecting from the rear side of the cross-head, and set-screw $h$. This loop is made of sheet iron, so that the hoop is very thin laterally, to travel in the narrow space between the guides F F with the saw. It being also advantageous to have all other parts which move with the saw as light as possible, I make the cross-head C hollow, by which it is made light, with sufficient strength, and allows the pitman also to be attached to the cross-head more nearly in line with the saw. A light pitman, $d$, of wood, is used. The cross-head runs in the adjustable guides $f\ f$.

I also obtain a further advantage by dropping the front edge of the table, so that the upper surface of the table is at right angles to the saw. This is to compensate for the rake of the saw, so that in sawing a circle the cut is not "dishing," but square; or, in sawing two curves toward each other, an uncut wedge-shaped piece is not left; and in this manner I obviate these objections, while all the advantage of a raking-saw is retained.

The loop $c$ may be dispensed with by giving the saw a curved arm, W, Fig. 5, at its lower end, and making the connection between this arm and the cross-head outside of the groove or space between the guides F F, and in such manner that the saw alone occupies said groove or space. However, I consider the loop $c$ as the more preferable. By these means I produce a saw which is very simple and effective, and which turns out a superior quality of work.

Having thus described my invention, what I claim as new, and desire to secure by Letters Patent, is—

A sheet-iron or other saw-holding loop, $c$, made very narrow laterally, and with the saw B run between guides F, below the table A, substantially as herein shown, and for the purpose described.

WILLIAM DOBSON.

Witnesses:
HENRY A. CHILDS,
HIRAM E. SICKELS.